United States Patent [19]

Salvio et al.

[11] Patent Number: 5,554,847
[45] Date of Patent: Sep. 10, 1996

[54] FLEXIBLY CONNECTABLE HIGH PRECISION THERMAL AND STRUCTURAL FOCAL PLANE ARRAY MOUNT

[75] Inventors: Paul R. Salvio, Palos Verdes Estates; Kevin A. Walsh, Inglewood, both of Calif.

[73] Assignee: Hughes Aircraft Company, Los Angeles, Calif.

[21] Appl. No.: 320,365

[22] Filed: Oct. 11, 1994

[51] Int. Cl.$^6$ .................................................. G01J 5/02
[52] U.S. Cl. .................................... 250/332; 250/349
[58] Field of Search .............................. 250/332, 349, 250/370.08

[56] References Cited

U.S. PATENT DOCUMENTS

| | | | |
|---|---|---|---|
| 3,786,269 | 1/1974 | Cooper | 250/332 X |
| 4,528,449 | 7/1985 | Gordon et al. | 250/349 X |
| 4,542,294 | 9/1985 | Tamura et al. | 250/349 X |
| 4,862,002 | 8/1989 | Wang et al. | 250/332 X |
| 5,302,824 | 4/1994 | Prager | 250/332 X |
| 5,371,369 | 12/1994 | Kent | 250/332 X |

FOREIGN PATENT DOCUMENTS 59-222731  12/1984  Japan .................................... 250/349

*Primary Examiner*—Carolyn E. Fields
*Assistant Examiner*—Edward J. Glick
*Attorney, Agent, or Firm*—G. S. Grunebach; M. W. Sales; W. K. Denson-Low

[57] ABSTRACT

An assembly for mounting a focal plane array. The assembly includes a fixture of thermally conductive material having a first substantially planar surface and a second surface. The fixture is attached to the focal plane array at the first surface and to a frame of a housing at the second surface thereof. In a specific embodiment, the assembly further includes a mechanism for aligning the fixture, with the attached array, to the frame and at least one flexible connector for electrically connecting the focal plane array to a circuit board disposed within the housing. In the illustrative embodiment, the alignment mechanism includes a clocking slot in the second surface of the fixture which is adapted to engage a protrusion on the frame.

13 Claims, 3 Drawing Sheets

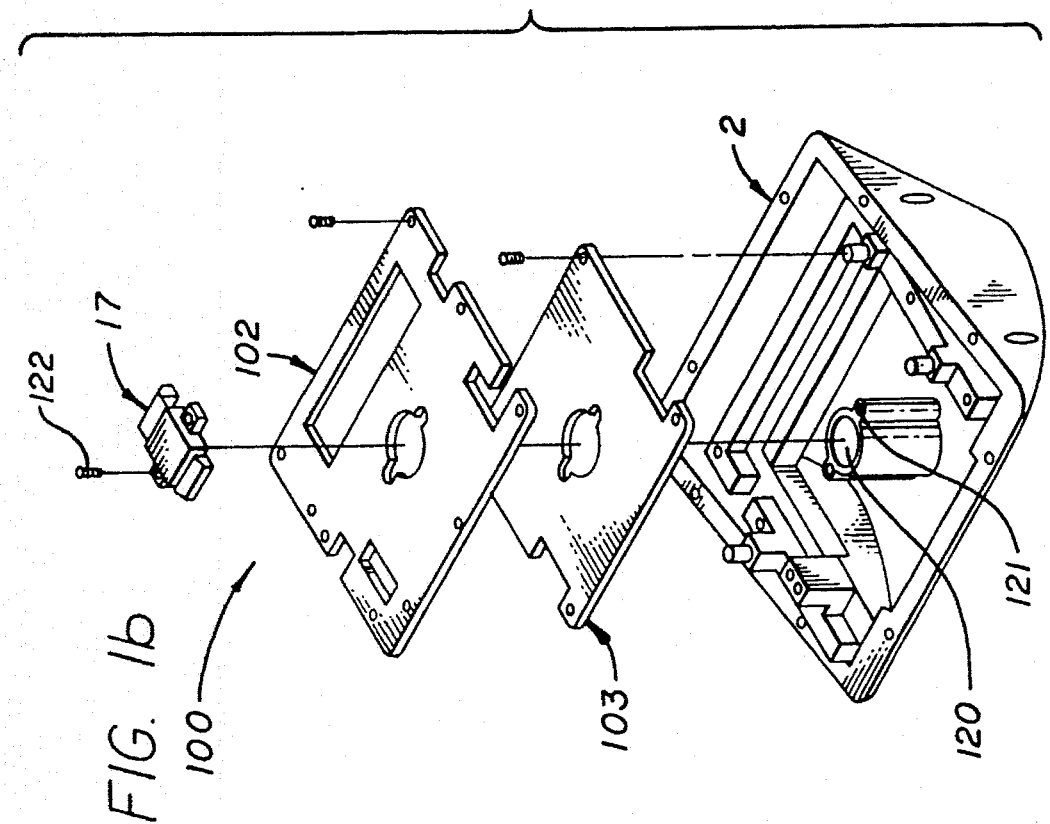
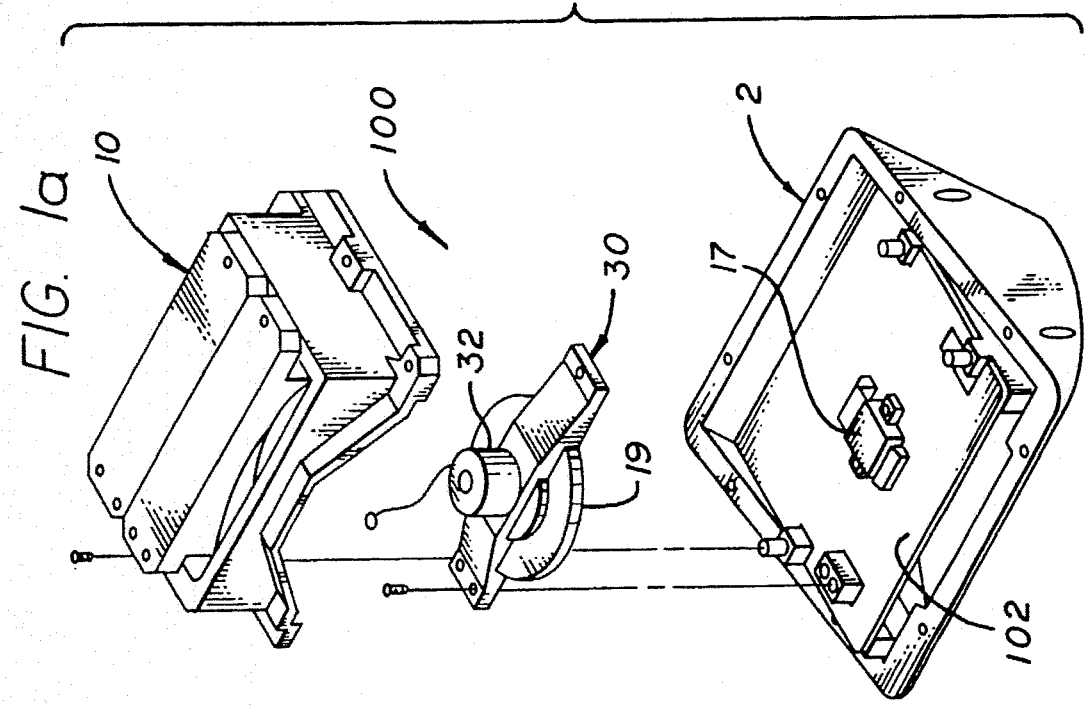

FLEXIBLY CONNECTABLE HIGH PRECISION THERMAL AND STRUCTURAL FOCAL PLANE ARRAY MOUNT

BACKGROUND OF THE INVENTION

1. Field of the Invention

The present invention relates to mechanical arrangements for mounting arrays. More specifically, the present invention relates to mechanical arrangements for mounting infrared focal plane arrays.

2. Description of the Related Art

U.S. patent application Ser. No. 08/232,893, entitled LOW COST NIGHT VISION CAMERA, filed Apr. 13, 1994, by Klapper et al., the teachings of which are incorporated herein by reference, discloses and claims a novel and advantageous night vision system which incorporates a low cost night vision camera. The camera includes a focal plane array (FPA) of uncooled infrared detector elements. Conventionally, the array was mounted directly in a connector socket which was soldered onto a printed circuit board. The pins of the connector positioned and aligned the FPA relative to the printed circuit board. The FPA was generally in thermal contact with a heat sink through the connector and the printed circuit board and the assembly was disposed within a housing.

The connector, printed circuit board and housing were typically of a custom design. Hence, despite the plastic construction of the connector, it has been a particularly expensive item to manufacture.

In addition, inasmuch as the printed circuit board served as an optical bench, it had to be precisely aligned to achieve a proper optical center line for the focal plane array. As the focal plane array must be precisely mounted, the precision mount of the circuit board substantially contributed to the cost and complexity of the board.

Finally, mounting the FPA on the circuit board also limited the signal board to one location within the housing.

Thus, a need existed in the art for an inexpensive yet effective system and technique for mounting a focal plane array within a night vision camera.

SUMMARY OF THE INVENTION

The need in the art is addressed by the present invention which provides an improved assembly for mounting a focal plane array. The inventive assembly includes a fixture of thermally conductive material having a first substantially planar surface and a second surface. The fixture is attached to the focal plane array on the first surface thereof and to a housing on the second surface thereof.

In a specific embodiment, the inventive assembly further includes a mechanism for aligning the fixture, and attached array, to the housing. The invention further includes at least one flexible connector for electrically connecting the focal plane array to a circuit board disposed within the housing. In the illustrative embodiment, the alignment mechanism includes a clocking slot in the second surface of the fixture which is adapted to engage a dowel pin in the housing.

BRIEF DESCRIPTION OF THE DRAWINGS

FIGS. 1a and 1b are inverted assembly views of the upper housing assembly of the inventive camera.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
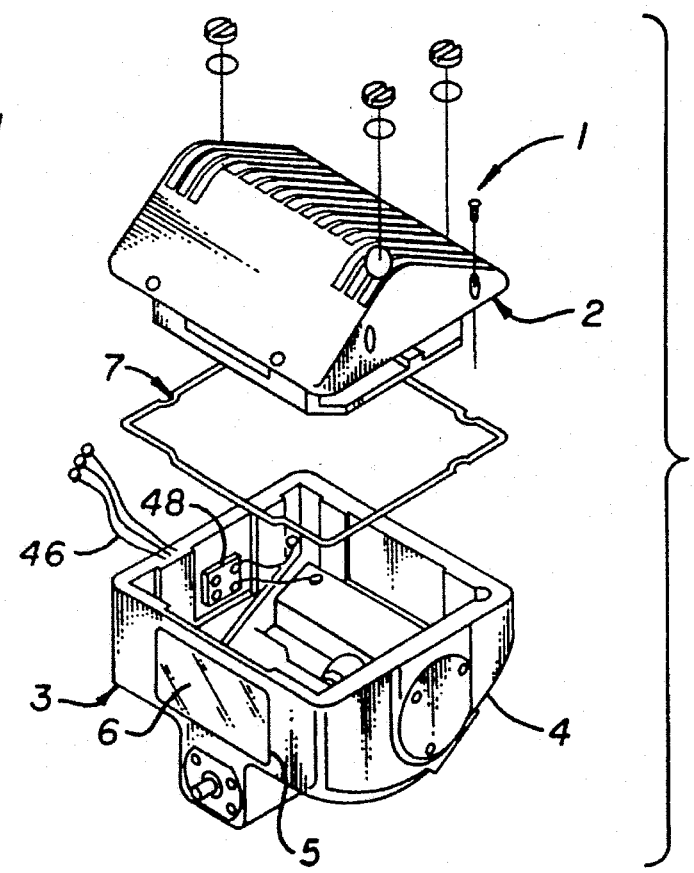
FIG. 1 is a simplified perspective view in disassembled relation of an illustrative embodiment of a night vision camera utilizing the teachings of the present invention.

FIG. 1 is a simplified perspective view in disassembled relation of an illustrative embodiment of a night vision camera 1 utilizing the teachings of the present invention. The camera 1 has an upper housing assembly 2 and a lower housing assembly 3. The lower assembly 3 has a housing 4 with a rectangular aperture 5 therethrough into which an infrared transmitting window 6 is fitted. The infrared transmitting window 6 protects the camera 1 from contaminants. A seal 7 is interposed between the upper housing assembly 2 and the lower housing assembly 3.

FIGS. 1a and 1b are inverted assembly views of the upper housing assembly 2. As shown in FIG. 1a, a chopper 30 is interposed between a focal plane assembly 17 and a compact reflective optical arrangement 10. The focal plane array assembly 17 comprises an array 20 and the inventive fixture 21, discussed more fully below.

The compact reflective optical arrangement is an optically fast, compact reflective optical arrangement for focusing energy onto the array 20. One such reflective optical arrangement is a WALRUS.

The chopper 30 includes the disk 19 and a motor 32. The chopper facilitates the sequential readout of the array 20 and aids in the establishment of a DC reference level for the array 20 which is representative of the average DC level of the scene. The chopper operates at a 30 hertz rate. The disk 19 is fabricated from optical-grade silicon.

A signal processing system on a video processor card 102 processes the output of the array 20 for display on any standard video screen. In addition, irregularities in the outputs of the detectors across the array 20 in response to a test pattern are corrected by the system 100. The system 1001 includes a power converter module 103 which provides power to the chopper motor 32. The power module 103 is connected to external circuitry such as a display (not shown) by lines 46 through a port 48 (FIG. 1).

Figure 2:
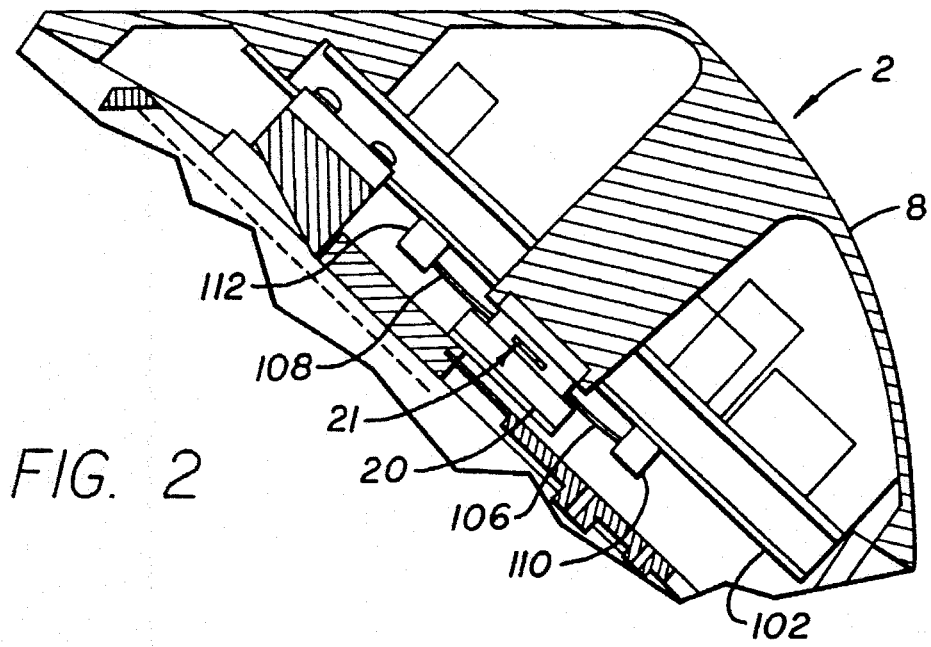
FIG. 2 is a partial sectional side view of the upper housing assembly of the inventive camera in assembled relation.

FIG. 2 is a partial sectional side view of the upper housing assembly 2 in assembled relation. The upper housing assembly 2 includes a housing 8 to which the inventive fixture 21 is bonded.

Figure 3:
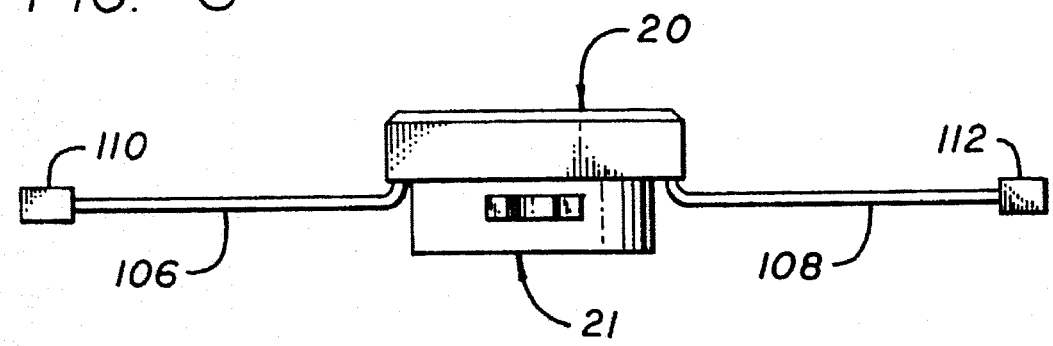
FIG. 3 is an elevated side view of the focal plane array and the fixture of the present invention.
Figure 4:
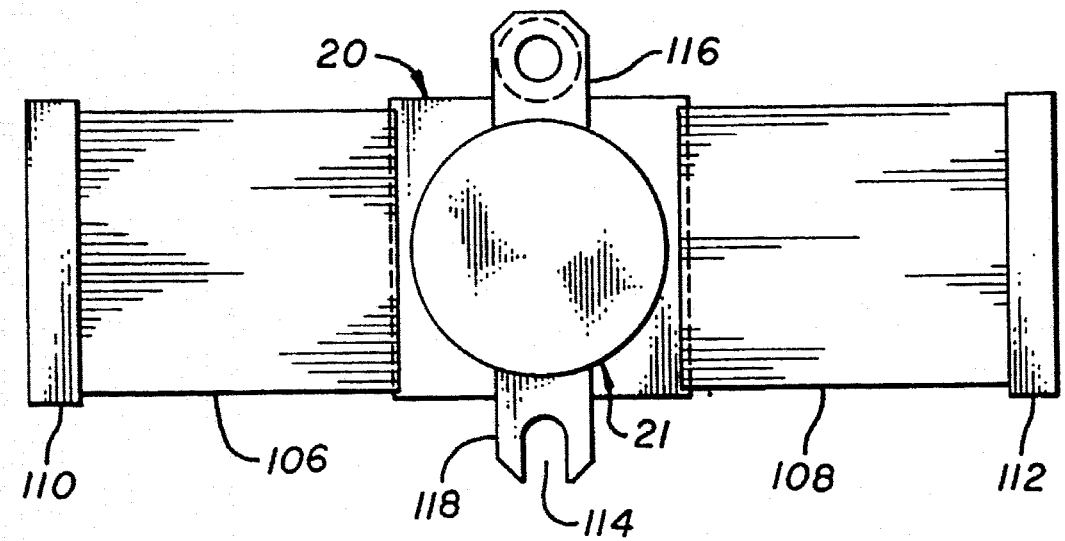
FIG. 4 is a bottom view of the focal plane array and fixture of the present invention.

FIGS. 3 and 4 show the focal plane array and the fixture of the present invention. The fixture 21 is made of conductive metal such as aluminum or other suitable material. The focal plane array 20 is bonded to the fixture 21 with a thermally conductive adhesive. First and second flexible cables 106 and 108 connect the focal plane array 20 to the video processor card 102 via first and second connectors 110 and 112, respectively. The flexible cables may be KAPTON® (plastic) clad copper. In the alternative, discreet wires may be soldered directly to the focal plane array 20. The connectors 110 and 112 are standard edge card connectors.

Precise alignment of the array 20 within the camera 1 is effected by aligning the FPA and then seating the fixture 21 within a precision hole 120 bored into the housing 8 (See FIG. 1b). The fixture 21 is attached to the focal plane array 20 at a bottom first surface and to the housing 8 at a upper second surface thereof. A precision slot 114 located in a tab 118 is aligned with a screw 122 that secures the fixture 21 to a post 121 in the housing 8 (FIG. 1b) This indexes the FPA 20 to the optical system very precisely. The fixture is secured to the two posts 121 in the housing 8 by the two screws 122 through screw clearance holes provided in tabs 116 and 118 (see FIG. 1b).

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A flexibly connectable high precision thermal and structural detector array mount for mounting an uncooled detector array to a frame within a night vision camera comprising:

a fixture of thermally conductive material having a first substantially planar surface and a second surface;

first means for attaching the uncooled detector array to the first surface of the fixture;

second means for attaching the fixture to the frame within a night vision camera at the second surface of the fixture;

third means disposed for aligning the fixture to the frame within the night vision camera; and fourth means to flexibly connect the uncooled detector array to a circuit board proximate the detector array.

2. The invention of claim 1 wherein the third means includes a slot.

3. The invention of claim 2 wherein the third means includes a protrusion in the frame adapted for engagement with the slot.

4. The invention of claim 1 wherein the fixture is aluminum.

5. The invention of claim 1 wherein the fixture is bonded to the uncooled detector array.

6. The invention of claim 5 wherein the frame is a housing having the circuit board disposed therein.

7. The invention of claim 6 wherein the fourth means includes at least one flexible connector for connecting the uncooled detector array to the circuit board.

8. A night vision camera comprising:

a housing assembly;

an array of uncooled detectors;

a thermally conductive fixture adapted to secure and align the array of uncooled detectors relative to the housing assembly;

means for attaching the thermally conductive fixture to the array of detectors;

means for attaching the thermally conductive fixture to the housing assembly;

a circuit board disposed within the housing assembly for processing signals from the array of uncooled detectors; and a flexible connector for electrically connecting the array of uncooled detectors to the circuit board.

9. The invention of claim 8 wherein the array is a focal plane array.

10. The invention of claim 9 wherein the fixture is aluminum.

11. The invention of claim 9 wherein the means for attaching the fixture to the array includes means for bonding the fixture to the focal plane array.

12. The invention of claim 8 wherein the circuit board is a video processing card.

13. The invention of claim 8 wherein the flexible connector is a flexible cable formed of plastic clad copper.

* * * * *